US 11,480,274 B2

(12) United States Patent
Handa

(10) Patent No.: US 11,480,274 B2
(45) Date of Patent: Oct. 25, 2022

(54) PIPE COUPLING

(71) Applicant: Janak H. Handa, Toronto (CA)

(72) Inventor: Janak H. Handa, Toronto (CA)

(*) Notice: Subject to any disclaimer, the term of this patent is extended or adjusted under 35 U.S.C. 154(b) by 144 days.

(21) Appl. No.: 15/496,279

(22) Filed: Apr. 25, 2017

(65) Prior Publication Data

US 2017/0307116 A1 Oct. 26, 2017

(30) Foreign Application Priority Data

Apr. 26, 2016 (CA) .............................. CA 2928221

(51) Int. Cl.

| | |
|---|---|
| *F16L 23/00* | (2006.01) |
| *F16L 23/08* | (2006.01) |
| *F16L 23/18* | (2006.01) |
| *F16L 23/22* | (2006.01) |
| *F16L 23/036* | (2006.01) |

(52) U.S. Cl.
CPC .............. *F16L 23/003* (2013.01); *F16L 23/08* (2013.01); *F16L 23/18* (2013.01); *F16L 23/22* (2013.01); *F16L 23/036* (2013.01)

(58) Field of Classification Search
CPC ....... F16L 23/003; F16L 23/036; F16L 23/08; F16L 23/18; F16L 23/22; F16L 23/024; F16L 21/04; F16L 21/08; F16L 23/02; F16L 23/04; F16L 19/06; F16L 19/061; F16L 21/06; F16L 21/065; F16L 17/06
USPC ........ 285/364, 337, 351, 379, 406, 414, 336
See application file for complete search history.

(56) References Cited

U.S. PATENT DOCUMENTS

| | | | | |
|---|---|---|---|---|
| 1,873,855 | A * | 8/1932 | Wilson .................... | F16L 23/20 285/368 |
| 3,479,063 | A * | 11/1969 | Raver ..................... | F16L 23/20 285/379 |
| 4,272,109 | A * | 6/1981 | Ahlstone ................. | F16L 23/18 285/379 |
| 4,441,725 | A * | 4/1984 | Bailey ..................... | F16L 23/18 |
| 4,900,063 | A * | 2/1990 | Baarfusser .............. | F16L 23/04 |
| 6,325,390 | B1 * | 12/2001 | Sillmon ................. | F16L 23/003 285/379 |
| 6,672,631 | B1 | 1/2004 | Weinhold | |
| 6,715,802 | B2 * | 4/2004 | Baker ................... | F16L 23/024 |

(Continued)

FOREIGN PATENT DOCUMENTS

| | | |
|---|---|---|
| EP | 0441619 B1 | 9/1994 |
| WO | 2015/011454 A1 | 1/2015 |

*Primary Examiner* — Zachary T Dragicevich
*Assistant Examiner* — William S. Choi
(74) *Attorney, Agent, or Firm* — Aird & McBurney LP

(57) ABSTRACT

A pipe coupling arrangement includes two end members, each having a pipe attachment end and a sealing end that engages the other's sealing end. Each sealing end includes radially inner and outer collars, which are radially separated by a pocket. When the sealing ends engage one another the pockets form a chamber. At least one seal member is positioned in the chamber. An alignment ring fits in the chamber, aligning the end members. A coupling pushes the end members towards each other, compressing the at least one seal member sufficiently to seal against fluid leakage. The inner collars engage one another while the outer collars of the end members are axially spaced apart by a gap selected to reduce to zero upon application of a selected clamping force on the end members, thereby limiting deformation of the outer collars.

4 Claims, 10 Drawing Sheets

(56) References Cited

U.S. PATENT DOCUMENTS

| | | |
|---|---|---|
| 6,896,301 B2 | 5/2005 | Brice |
| 7,159,906 B1 * | 1/2007 | Vaudreuil ............... F16L 23/22 285/364 |
| 2007/0024007 A1 * | 2/2007 | Putch ..................... F16L 23/18 277/314 |
| 2012/0056419 A1 | 3/2012 | Davidson |

* cited by examiner

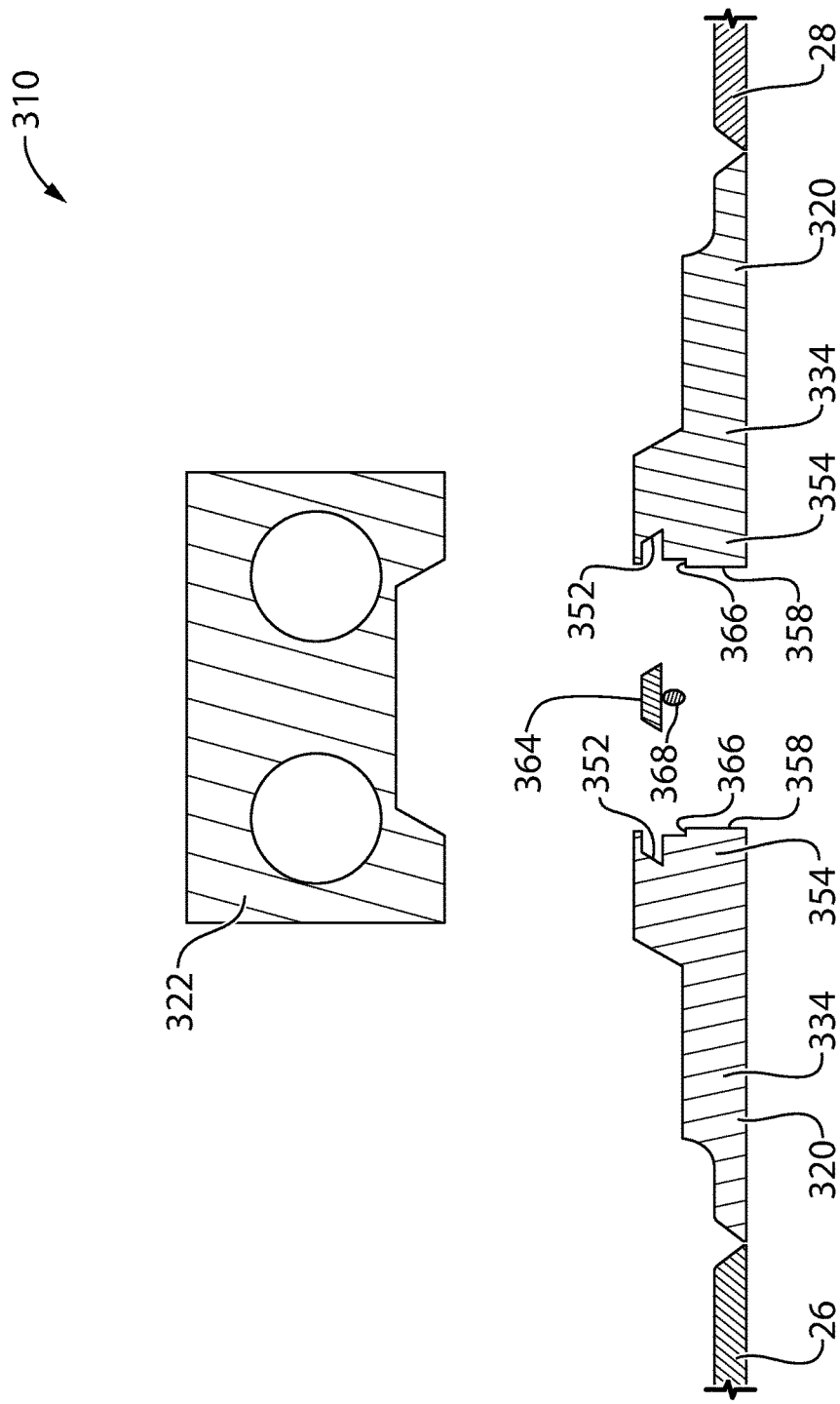

PIPE COUPLING

FIELD

The present disclosure relates to the field of industrial pipe couplings, and in particular to a pipe coupling having improved contact performance at the contact interface.

BACKGROUND

Industrial piping systems, such as those used for hydrocarbon transport/distribution, employ a variety of pipe coupling arrangements to join together lengths of pipe. Such systems typically convey fluids, in liquid or gaseous form, requiring a high performance sealing arrangement to prevent the egress of fluid from the piping system.

Coupling arrangements sometimes incorporate mutually engaged flanged end members with mechanical gaskets (e.g. elastomeric members) between the mutually engaged faces of the end members, to ensure a sealed connection. Such systems depend on deformation of the mechanical gasket to provide a sealing interface. Over time, such systems can begin to leak due to degradation of the mechanical seal.

There is a continuing need to develop pipe coupling systems having improved sealing performance, to ensure the safe transport of fluids, in particular for industrial application.

SUMMARY

According to an aspect a pipe coupling arrangement for connecting two pipes is provided. The pipe coupling arrangement includes a pair of end members that are generally annular. Each end member has a pipe attachment end configured for attachment to a respective one of the two pipes. Each end member further has a sealing end configured to engage the sealing end of the other end member. The sealing end of each end member includes a radially inner collar and a radially outer collar and a pocket between the radially inner and outer collars. When the sealing ends engage one another the pockets together form a chamber. At least one seal member is provided and is positioned in the chamber. An alignment ring is provided and is sized to fit in the chamber to align the pair of end members so as to be coaxial with one another. The alignment ring has an axial length. A coupling is provided and is configured to impart a selected clamping force upon the end members towards each other, so as to compress the at least one seal member sufficiently to cause the at least one seal member to seal against leakage of fluid from within the pipes therepast. The radially outer and inner collars are arranged such that, when the inner collars of the end members engage one another at an inner collar interface, the outer collars of the end members are axially spaced from one another by a gap that is sized to prevent escape of the alignment ring and the at least one seal member from the chamber.

In another aspect, a pipe coupling arrangement for connecting two pipes is provided. The pipe coupling arrangement includes a pair of end members that are generally annular. Each end member has a pipe attachment end configured for attachment to a respective one of the two pipes. Each end member further has a sealing end configured to engage the sealing end of the other end member. The sealing end of each end member includes a radially inner collar and a radially outer collar and a pocket between the radially inner and outer collars. When the sealing ends engage one another the pockets together form a chamber. At least one seal member is positioned in the chamber. Each seal member from the at least one seal member has an axial length. A coupling is provided and is configured to impart a selected clamping force upon the end members towards each other, so as to compress the at least one seal member sufficiently to cause the at least one seal member to seal against leakage of fluid from within the pipes therepast. The radially outer and inner collars are arranged such that, when the inner collars of the end members engage one another at an inner collar interface, the outer collars of the end members are axially spaced from one another by a gap that is sized to prevent escape of the alignment ring and the at least one seal member from the chamber.

BRIEF DESCRIPTION OF FIGURES

The foregoing and other features and advantages of the disclosure will be apparent from the following description of embodiments hereof as illustrated in the accompanying drawing. The accompanying drawings, which are incorporated herein and form a part of the specification, further serve to explain the principles of the disclosure and to enable a person skilled in the pertinent art to make and use the disclosure. The drawings are not to scale.

FIG. 2 is a partial exploded sectional view of the pipe coupling according to the embodiment of FIG. 1a.

FIG. 3 is a fully exploded partial sectional view of the pipe coupling according to the embodiment of FIG. 1a.

FIG. 9 is an exploded partial sectional view of the pipe coupling according to the embodiment of FIG. 8.

DETAILED DESCRIPTION

Figure 1A:
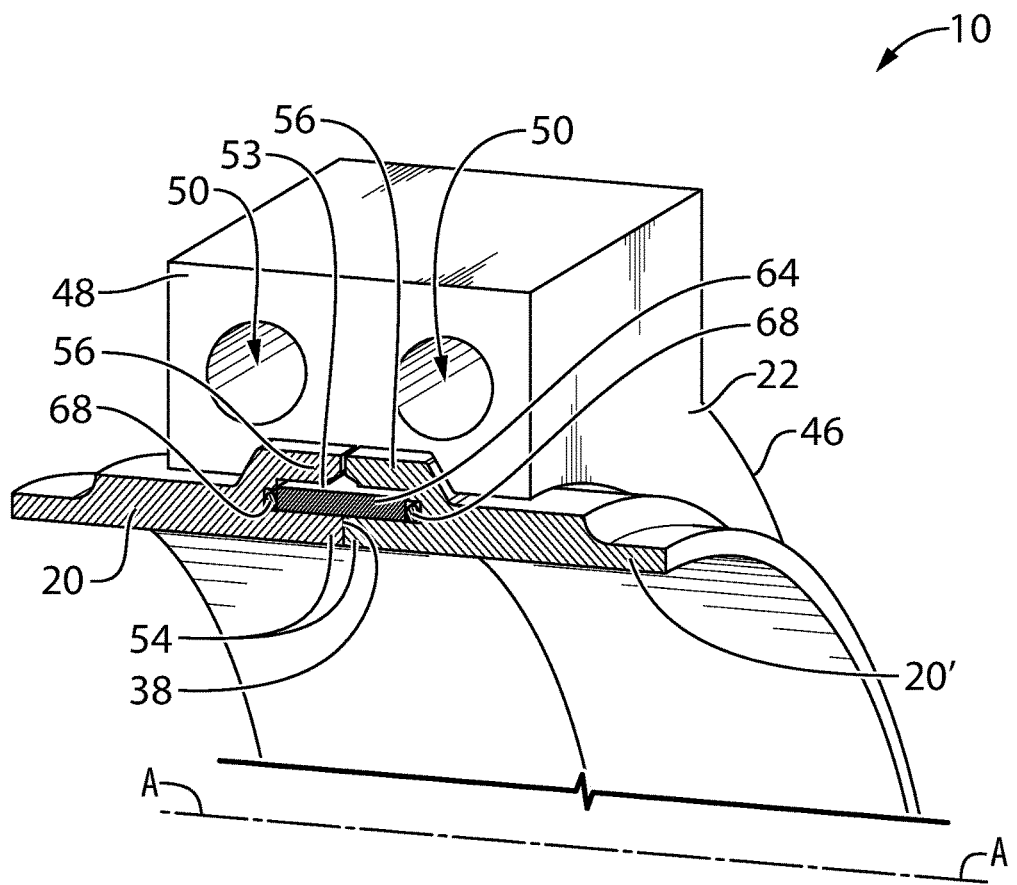
FIG. 1a is a partial perspective view of a pipe coupling arrangement according to a first embodiment hereof.
Figure 1B:
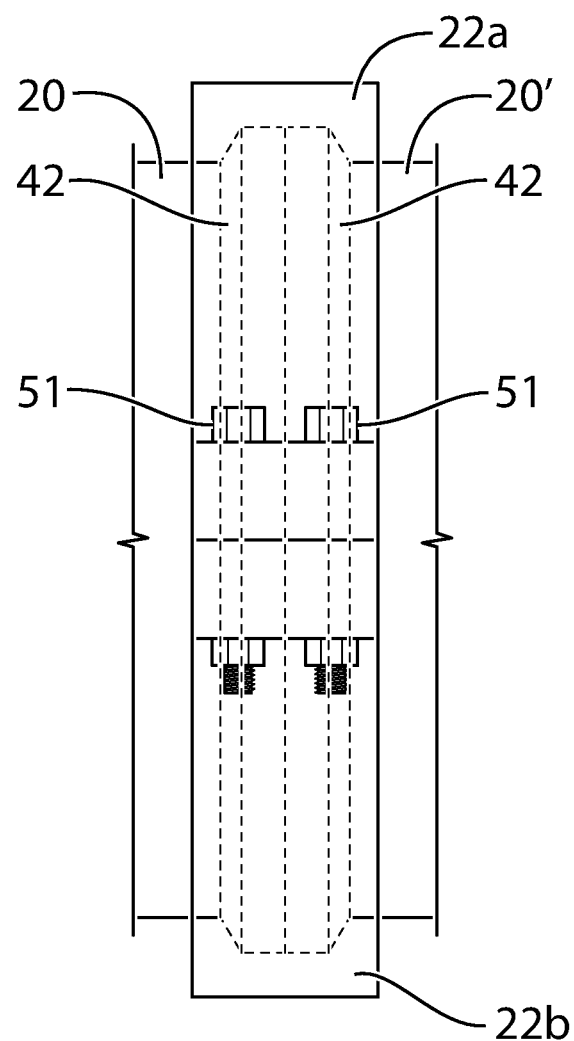
FIG. 1b is an elevation view of a portion of the pipe coupling arrangement.

The following detailed description is merely exemplary in nature and is not intended to limit the disclosure or the application and uses of the disclosure. A person skilled in the relevant art will recognize that other configurations and arrangements can be used without departing from the scope of the disclosure. Furthermore, there is no intention to be bound by any expressed or implied theory presented in the preceding technical field, background, brief summary, or the following detailed description.

Referring now to FIGS. 1a-3, illustrated is a first embodiment of a pipe coupling arrangement 10 used to connect two sections of pipe, shown at 26 and 28. The sections of pipe 26 and 28 may, for convenience also be referred simply as two pipes 26 and 28. The pipe coupling arrangement 10 comprises a pair of generally annular end members 20 and 20' that engage one another to form a contact seal. In the embodiment shown, the end members 20 and 20' are formed with identical sectional profiles, however they need not have precisely identical sectional profiles for them to form a contact seal. The end members 20 and 20' are urged together by a coupling 22 which is adapted to apply axial forces to the respective end members 20 and 20' urging the end members 20 and 20' towards each other.

Each end member 20 and 20' has a pipe attachment end 24 configured for attachment to a respective one of the two pipes 26 or 28. The pipe attachment end 24 may be attachable to the corresponding pipe 26 or 28 in any suitable way. For example, both the pipe attachment end 24 and the corresponding mating end (shown at 32) of the pipe 26 or 28 may each be provided with a bevel 30, so that the bevels 30 together form a valley suitable for receiving a circumferential weld. Alternatively, the end members 20 and 20' may be sized to slip over the end 32 of the pipe 26 and 28, and a suitable weld such as a fillet weld may be used to join the end members 20 and 20' to the respective pipes 26 and 28, thereby eliminating the need for the bevels 30.

The end members 20 and 20' may be made from any suitable material, such as steel particularly where the pipes 26 and 28 are made from steel.

Figure 2:
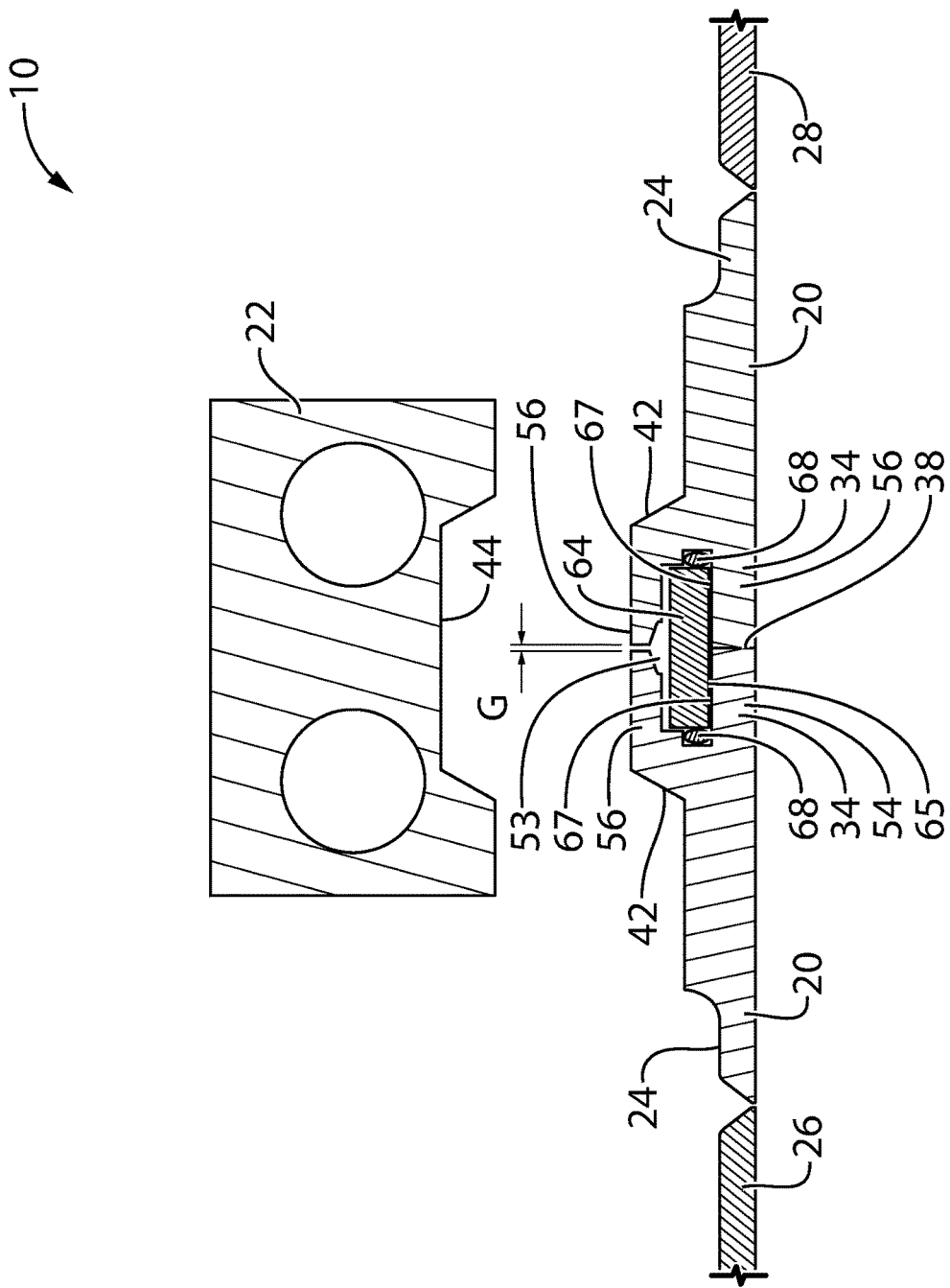
Figure 3:
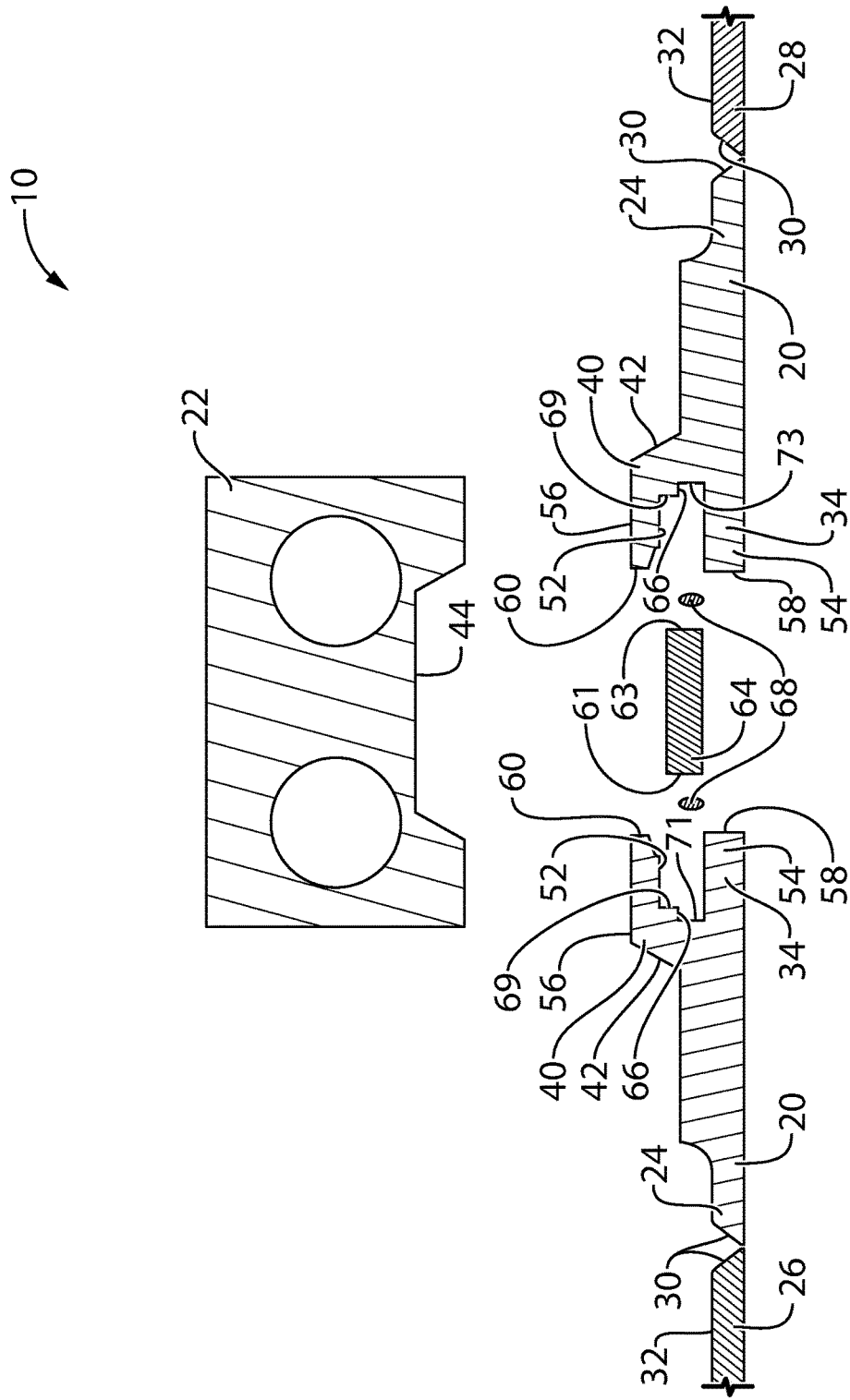

The end members 20 and 20' each include a sealing end 34 opposite the pipe attachment end 24. The sealing end 34 of each end member 20 or 20' is configured to engage the sealing end 34 of the other end member 20 or 20'. As shown in FIGS. 1a-3 the sealing end 34 of each end member 20 and 20' includes a radially inner collar 54 and a radially outer collar 56. The radially inner and outer collars 54 and 56 are radially separated from one another. A pocket 52 is positioned between the inner and outer collars 54 and 56. When the sealing ends 34 engage one another (as shown in FIGS. 1a and 2) the inner collars 54 of the end members 20 and 20' engage one another at an inner collar interface 38, and the pockets 52 together form a chamber 53. The outer collars 56 do not engage one another but are instead spaced apart by a gap G (FIG. 2).

Put another way, the radially inner and outer collars 54 and 56 of the end members 20 and 20' are arranged such that, when the inner collars 54 engage one another at the inner collar interface 38 (e.g. when the mutually facing surfaces 58 of the inner collars 54 engage one another), the outer collars 56 (more specifically the mutually facing surfaces 60 of the outer collars 56) are axially spaced from one another by the gap G. By ensuring that the gap G is present at the outer collars 156, the inner collars 154 are assured of contacting one another, thereby reducing the pressure of any fluid that escapes past the interface 38. The gap G is selected to be sufficiently small to prevent any of the components present in the chamber 53 from escaping, such as the alignment ring 64 and the seal members 68.

An alignment ring 64 is provided and is sized to fit in the chamber 53 to align the end members 20 and 20' and to hold the end members in a coaxial relationship with one another until the coupling 22 is installed and sufficiently tightened on the end members 20 and 20'. To this end, the alignment ring 64 may have a radially inner surface 65 (FIG. 2) that engages a radially outwardly facing wall 67 in the pocket 52 of each of the end members 20 and 20'. Alternatively, the alignment ring 64 could instead engage with its radially outer surface against a radially inwardly facing wall in the pocket of each of the end members 20 and 20'.

The alignment ring 64 is shown as having a generally rectangular cross-sectional shape. The chamber 53 may also have a generally rectangular cross-sectional shape.

Optionally, each pocket 52 includes an axial limit surface 69 such that the axial limit surfaces 69 together control axial positioning of the alignment ring 64 in the chamber 53 so as to cause the alignment ring 64 to cover the inner collar interface 38, and to cause the alignment ring 64 engage both end members 20 and 20'.

At least one seal member 68 is positioned in the chamber 53. In the example shown in FIGS. 1-3, two seal members 68 are shown, which may be referred to as first and second seal members 68. More specifically, the alignment ring 64 has a first axial end surface 61 and a second axial end surface 63. The first and second seal members 68 are positioned to be compressed between the respective first and second axial end surfaces 61 and 63 of the alignment ring 64 and opposing sealing surfaces 71 and 73 of the chamber 53. The sealing surfaces 71 and 73 may be provided in circumferential seal channels 66. The seal members 68 may be any suitable type of seal members such as, for example, O-rings, which may be made from urethane or from any other suitable material.

The coupling 22 is configured to impart a selected clamping force (i.e. the aforementioned axial forces) upon the end members 20 and 20' so as to urge the end members 20 and 20' towards each other, so as to compress the at least one seal member 68 (e.g. the two seal members 68 in the embodiment shown in FIGS. 1a-3) sufficiently to cause the at least one seal member 68 to seal against leakage of fluid from within the pipes 26 and 28 therepast (i.e. past the at least one seal member 68). The clamping force is achieved by engagement of first angled surfaces 45 in a channel 44 in the coupling 22, which matingly engage second angle surfaces 42 on the end members 20 and 20'. The term 'angled' in this case means that the surfaces 45 and 42 extend at some non-zero angle relative to the pipe axes, which are shown at A. By angling the surfaces 45 and 42 to have a non-zero angle with one another, tightening of the coupling 22 increases the clamping force exerted by the coupling 22 on the end members 20 and 20'. However, it is possible to provide an embodiment in which the surfaces 45 and 42 extend directly radially. The tightening of the coupling 22 so as to apply a clamping force on the end members 20 and 20' may be by any suitable means. For example, the coupling 22 may include a plurality of coupling segments (e.g. two coupling segments 22a and 22b) which all straddle the surfaces 42 on the two end members 20 and 20' and which have fastener apertures 50 which are aligned so that fasteners (shown at 51 in FIG. 1b) can be inserted through the apertures 50 to lock the coupling segments 22a and 22b. Suitable fasteners 51 include, for example, bolts with nuts.

Figure 4:
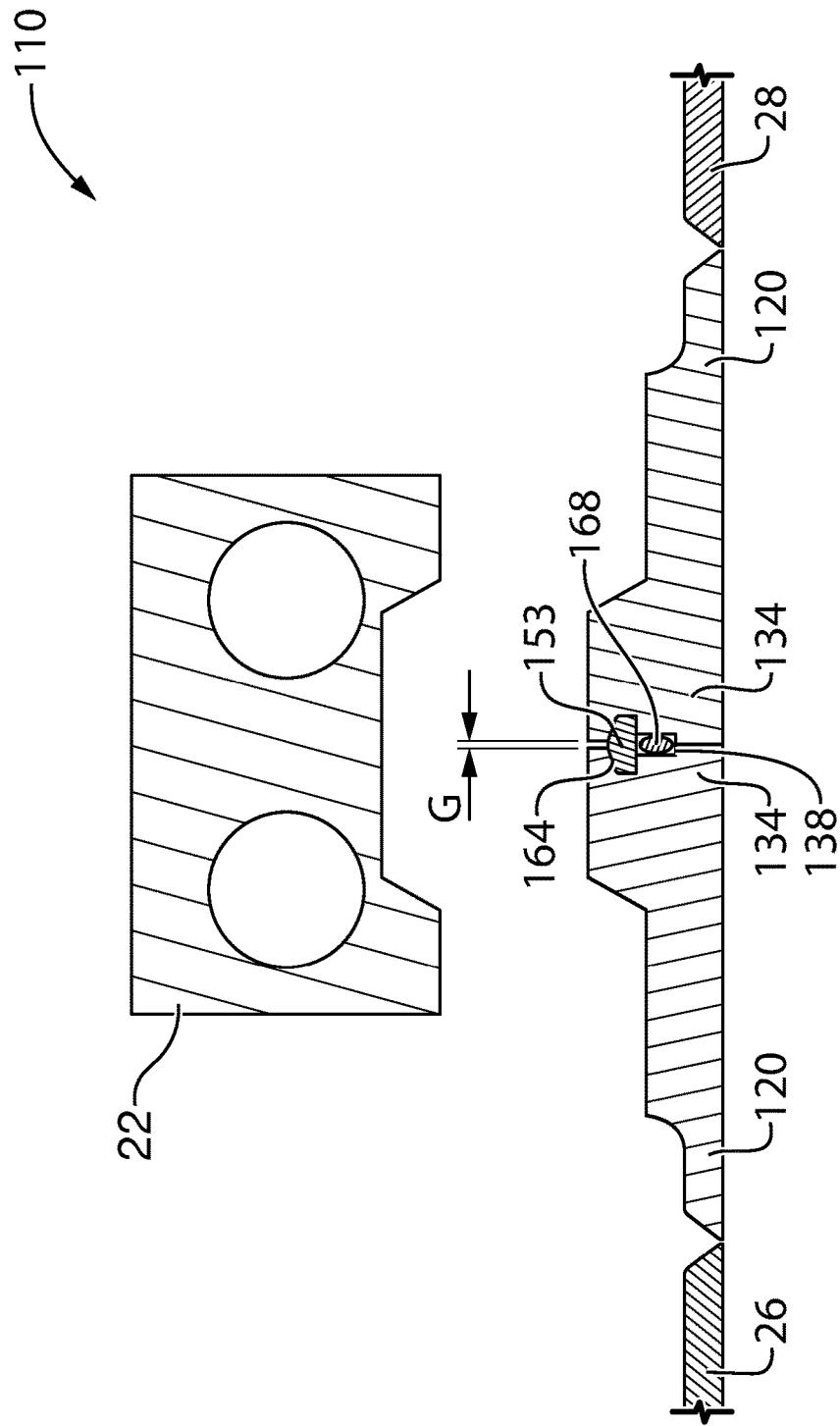
FIG. 4 is a partial sectional view of a pipe coupling according to a second embodiment hereof.
Figure 5:
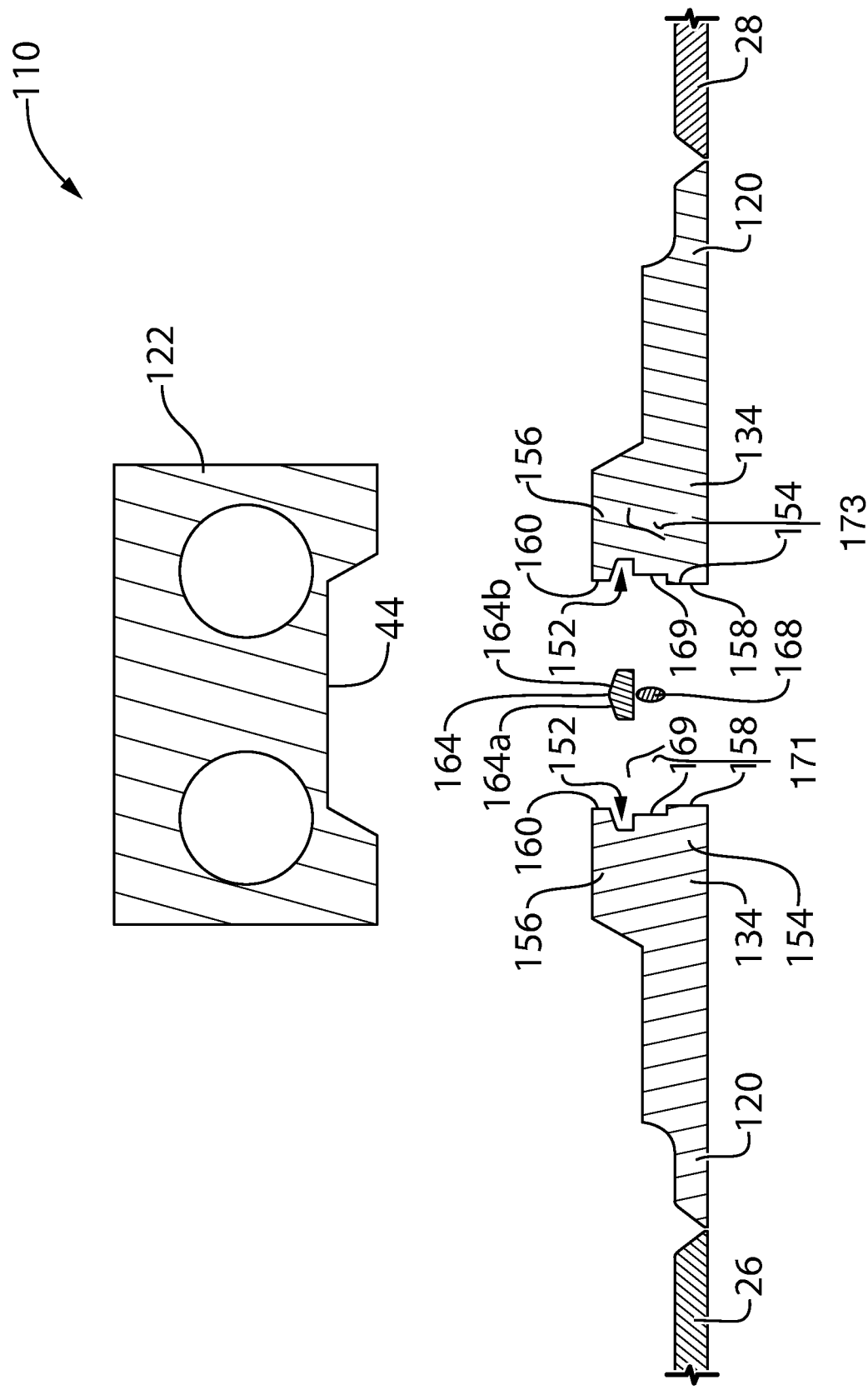
FIG. 5 is an exploded partial sectional view of the pipe coupling according to the embodiment of FIG. 4.

Reference is made to FIGS. 4 and 5, which show a second embodiment of a pipe coupling arrangement 110 that is similar to the pipe coupling arrangement 10 in FIGS. 1a-3. Structure in FIGS. 4 and 5 that is similar to structure shown in FIGS. 1a-3 is denoted with a reference number that is the same as the corresponding reference number in FIGS. 1a-3, but increased by 100. The pipe coupling arrangement 110 comprises a pair of end members 120 and 120' that engage to form a contact seal therebetween.

Thus, the end members 120 and 120' each include a sealing end 134 that is similar to the sealing end 34, and a pipe attachment end 124 that is similar to the pipe attachment end 24. The sealing end 134 includes radially inner and outer collars 154 and 156 which are arranged such that, when the inner collars 154 (e.g. the first mutually facing surfaces 158) engage one another at the inner collar interface shown at 138, the outer collars 156 (e.g. the second mutually facing surfaces 160) are axially spaced from one another by a gap G.

As described above in relation to the coupling arrangement 10 shown in FIGS. 1a-3, the gap G is present at the outer collars 156 to ensure that the inner collars 154 are assured of contacting one another, thereby reducing the pressure of any fluid that escapes past the interface 138. The gap G is selected to be sufficiently small to prevent any of the components present in the chamber 153 from escaping, such as the alignment ring 164 and the seal member 168.

In the embodiment shown in FIGS. 4 and 5, each end member 120 or 120' has a pocket 152 that is provided between the inner and outer collars 154 and 156. When the sealing ends 134 are engaged with one another, the pockets 152 together form a chamber 153. There is an alignment ring 164 that is positioned in the chamber 153 between two opposing axial limit surfaces 169 which are similar in function to the surfaces 69.

A difference in the embodiment shown in FIGS. 4 and 5 and the embodiment shown in FIGS. 1a-3 is that there is a single seal member shown at 168, which may be similar to the seal members 68, and which is positioned radially offset (in this example, radially inside) of the alignment member 164 between two opposing sealing surfaces 171 and 173 on the end members 120 and 120'. The seal member 168 is positioned in a single circumferentially extending seal channel 166 that is defined in part by the two sealing surfaces 171 and 173. The seal member 168 compresses against the sealing surfaces 171 and 173 so as to seal against the leakage of fluid from within the pipes 26 and 28 therepast. Because the seal member 168 seals against surfaces of the chamber 153 (i.e. surfaces 171 and 173) and is radially inside of the alignment ring 164, the seal member 168 substantially prevent contact between the fluid in the pipes 26 and 28 and the alignment ring 164.

To inhibit pinching of the seal member 168 during engagement of the inner collars 154, the inner diameter of the seal member 168 may be made larger than the outer diameter of the inner collars 154.

Another difference in the embodiment shown in FIGS. 4 and 5 and the embodiment shown in FIGS. 1a-3 is that the alignment ring 164 has an optional, generally pentagonal cross-sectional shape, which includes circumferentially extending surfaces 164a and 164b which are at a non-zero angle relative to one another.

Figure 6:
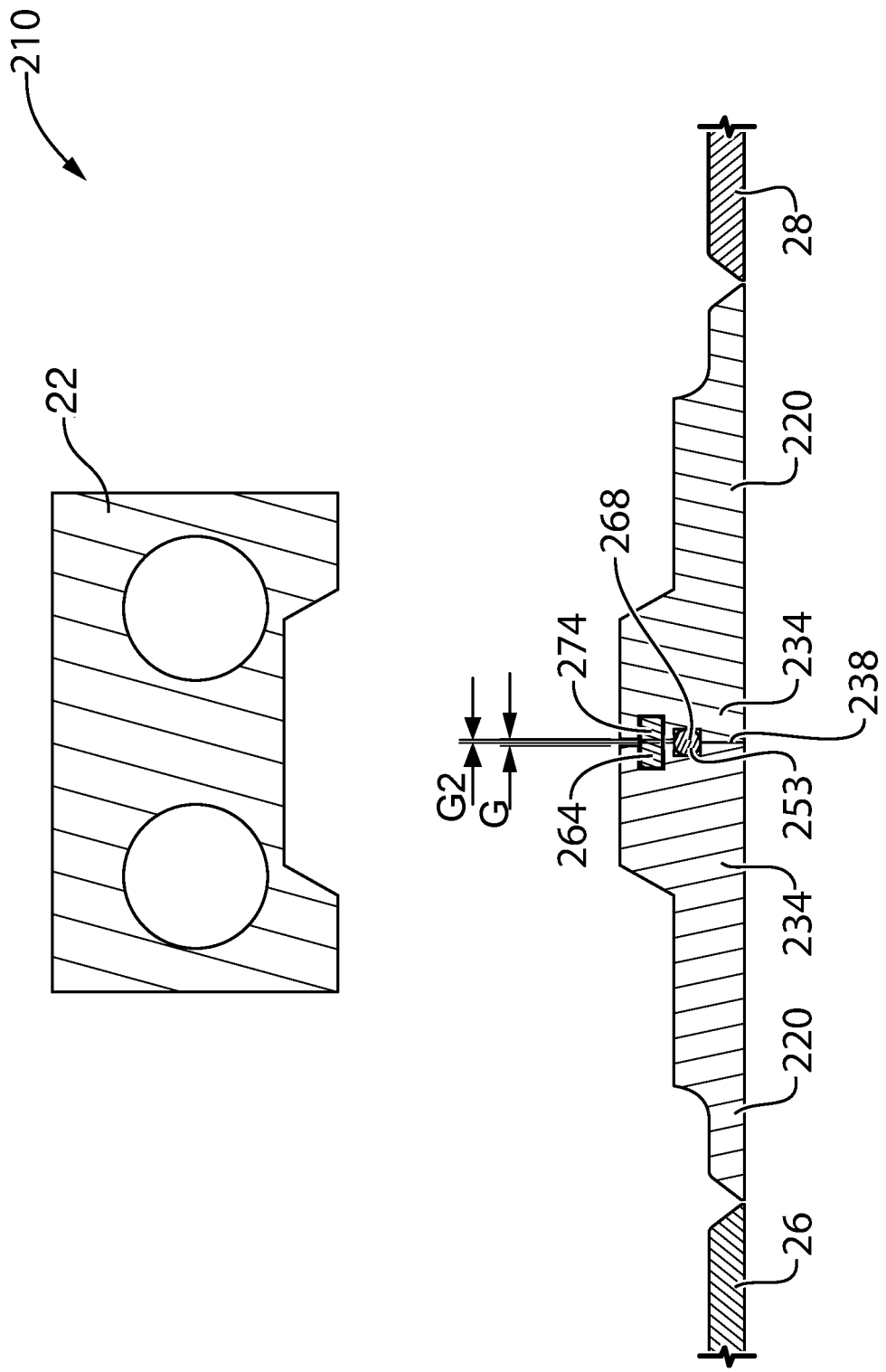
FIG. 6 is a partial sectional view of the pipe coupling according to a third embodiment hereof.
Figure 7:
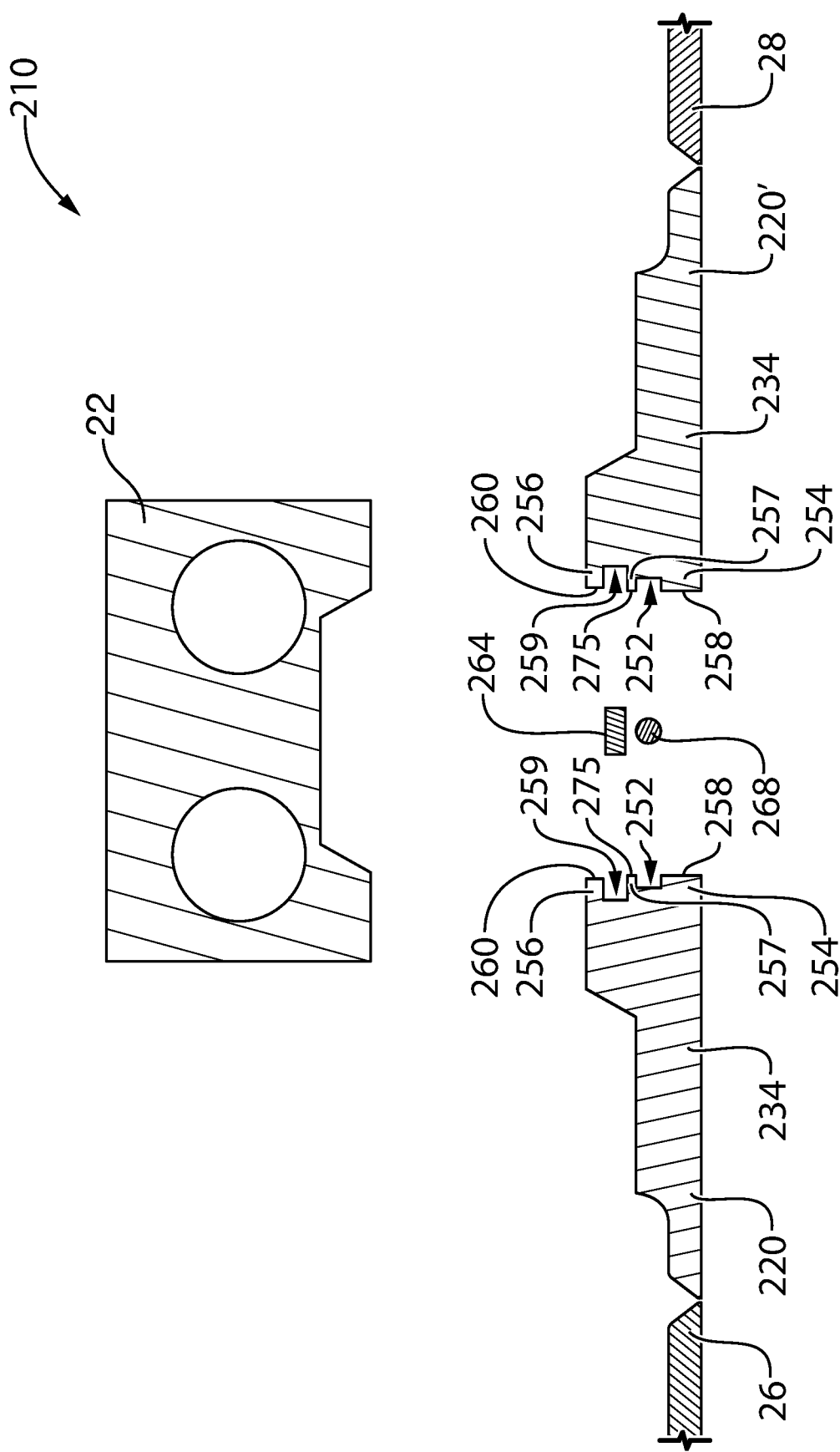
FIG. 7 is an exploded partial sectional view of the pipe coupling according to the embodiment of FIG. 6.

Reference is made to FIGS. 6 and 7, which shows a pipe coupling arrangement 210 according to another embodiment. The pipe coupling arrangement 210 has an alternative arrangement of the alignment ring and the seal member, shown at 264 and 268 respectively. Structure in FIGS. 6 and 7 that is similar to structure shown in FIGS. 4-5 is denoted with a reference number that is the same as the corresponding reference number in FIGS. 4-5, but increased by 100. The pipe coupling arrangement 210 includes a pair of end members 220 and 220' that engage to form a contact seal therebetween.

The end members 220 and 220' each have a sealing end 234 which coaxially align with one another and which engage at a sealing interface 238. As shown, the sealing ends 234 of the end members 220 and 220' are each configured with a circumferential pocket 252 defined by a radially inner collar 254 and a radially outer collar 256. When the sealing ends 234 are engaged with one another, the pockets 252 together form a chamber 253 in which the seal member 268 is positioned.

The inner collars 254 have mutually facing surfaces 258, while the outer collars 256 have mutually facing surfaces 260.

A difference between the pipe coupling arrangement 210 and the pipe coupling arrangement 10 is that the alignment member 264 and the seal member 268 are kept in separate chambers. More particularly, the outer collars 256 are first outer collars, and each sealing end 234 includes a second outer collar 257 that is radially spaced from both the first outer collar 256 and the inner collar 254, such that the pocket 252 (which may be referred to as the first pocket 252) is provided immediately between the inner collar 254 and the second outer collar 257 and a second pocket 259 is provided immediately between the second outer collar 257 and the first outer collar 256. Thus, both pockets 252 and 259 are provided between the inner and outer collars 254 and 256. When the sealing ends 234 engage one another the pockets 252 (which may be referred to as the first pockets 252) together form the chamber 253 as noted above (which may be referred to as the first chamber 253), and the second pockets 259 together form a second chamber 274.

The inner collars 254 have mutually facing surfaces 258, the first outer collars 256 have mutually facing surfaces 260 and the second outer collars 257 have mutually facing surfaces 275. When the inner collars 254 (e.g. the first mutually facing surfaces 258) engage one another at the inner collar interface shown at 238, the first outer collars 256 (e.g. the mutually facing surfaces 260) and the second outer collars 247 (e.g. the mutually facing surfaces 275) are axially spaced from one another by gaps G and G2 respectively. By ensuring that the gaps G and G2 are present at the outer collars 256 and 257, the inner collars 254 are assured of contacting one another, thereby reducing the pressure of any fluid that escapes past the interface 238. The gaps G and G2 are selected to be sufficiently small to prevent any of the components present in the chambers 253 and 274 from escaping, such as the alignment ring 64 and the seal member 68.

The alignment ring 264 is sized to fit in the second chamber 274 to align the pair of end members 220 and 220' so as to be coaxial with one another.

Figure 8:
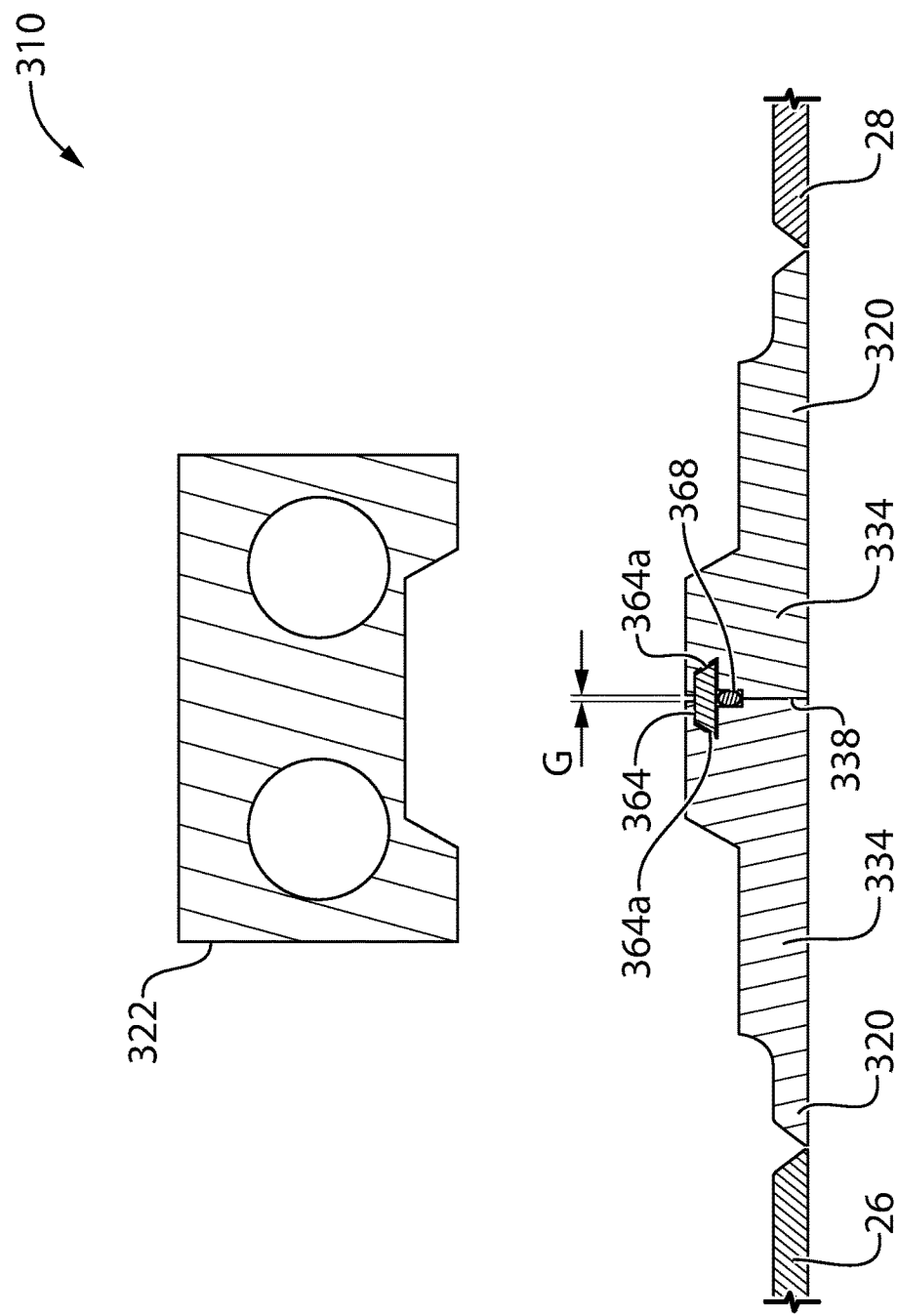
FIG. 8 is a partial sectional view of the pipe coupling according to a forth embodiment hereof.

Referring to FIGS. 8 and 9, a pipe coupling arrangement 310 is shown and includes a pair of annular end members 320 and 320' that engage to form a contact seal therebetween using a seal member 368. A coupling 322 is provided for applying a clamping force to the end members 320 and 320', and an optional alignment ring 364 is shown. In FIGS. 8 and 9, structure similar to that described above with reference to FIGS. 4 and 5 includes the same reference number increased by 200.

Each end member 320 and 320' includes a sealing end 334, and a pipe attachment end 324. The sealing end 334 includes radially inner and outer collars 354 and 356 which are arranged such that, when the inner collars 354 (e.g. the first mutually facing surfaces 358) engage one another at the inner collar interface shown at 338, the outer collars 356 (e.g. the second mutually facing surfaces 360) are axially spaced from one another by a gap G. As described above in relation to the coupling arrangement 10 shown in FIGS. 1a-3, the gap G is present at the outer collars 356 to ensure that the inner collars 354 are assured of contacting one another, thereby reducing the pressure of any fluid that escapes past the interface 338. The gap G is selected to be sufficiently small to prevent any of the components present in the chamber 353 from escaping, such as the alignment ring 364 and the seal member 368.

The alignment ring 364 has an optional, generally trapezoidal cross-sectional shape, which includes circumferentially extending surfaces 364a and 364b which are at a non-zero angle relative to one another. The chamber in which the alignment member 364 is positioned, shown at 353, has corresponding angled chamber surfaces that mate with the surfaces 364a and 364b.

It will be appreciated that with respect to any of the embodiments detailed above, pocket and alignment ring configurations, in particular the cross-sectional profile may vary, as other profiles may be suitably implemented.

While the pairs of end members shown in the figures are shown having identical sectional profiles, it will be appreciated that a pair of end members may include two end members having structural differences from one another. For example, while the various contact interfaces detailed above may remain substantially as described, one of the end members in the pair may be configured to be longer or present a bend therein for placement between two pipe sections that are angled relative to one another.

It will be appreciated that, although embodiments of the disclosure have been described and illustrated in detail, various modifications and changes may be made. While preferred embodiments are described above, some of the features described above can be replaced or even omitted. Still further alternatives and modifications may occur to those skilled in the art. All such alternatives and modifications are believed to be within the scope of the disclosure.

What is claimed is:

1. A pipe coupling arrangement for connecting two pipes, the pipe coupling arrangement comprising:

a pair of end members that are annular, each end member having a pipe attachment end configured for attachment to a respective one of the two pipes, each end member further having a sealing end configured to engage the sealing end of the other end member, wherein the sealing end of each end member includes a radially inner collar and a radially outer collar and a pocket between the radially inner and outer collars, the radially outer collar being the entirety of the sealing end that is radially outside of the pocket, wherein, when the sealing ends engage one another the pockets together form a chamber;

at least one seal member positioned in the chamber to prevent fluid leakage past the at least one seal member during use;

an alignment ring sized to fit in the chamber to align the pair of end members so as to be coaxial with one another, the alignment ring having an axial length, wherein the at least one seal member includes a first seal member that is radially offset from the alignment ring and is compressible between radially extending walls of the chamber when the selected clamping force is applied by the coupling so as to seal against leakage of fluid from within the pipes therepast, wherein the first seal member is radially inside of the alignment ring and seals only against surfaces of the chamber against fluid leakage from within the pipes so as to prevent contact between the fluid in the pipes and the alignment ring; and a coupling configured to impart a selected clamping force upon the end members, so as to compress the at least one seal member sufficiently to cause the at least one seal member to seal against leakage of fluid from within the pipes therepast, wherein the radially outer and inner collars are arranged such that, when the inner collars of the end members engage one another at an inner collar interface, the outer collars of the end members are axially spaced from one another by a gap that is sized to prevent escape of the alignment ring and the at least one seal member from the chamber, wherein the inner collars are arranged such that the inner collar interface is inboard of the chamber, and as a result inboard of the alignment ring and the at least one seal member.

2. A pipe coupling arrangement as claimed in claim 1, wherein each pocket includes an axial limit surface such that the axial limit surfaces together control axial positioning of the alignment ring in the chamber to ensure that the alignment ring covers the inner collar interface.

3. A pipe coupling arrangement as claimed in claim 1, wherein the at least one sealing member is at least one O-ring.

4. A pipe coupling arrangement as claimed in claim 1, wherein the chamber and the alignment ring are both one of a pentagonal cross-sectional shape, a rectangular cross-sectional shape, and a trapezoidal cross-sectional shape.

* * * * *